Patented May 17, 1927.

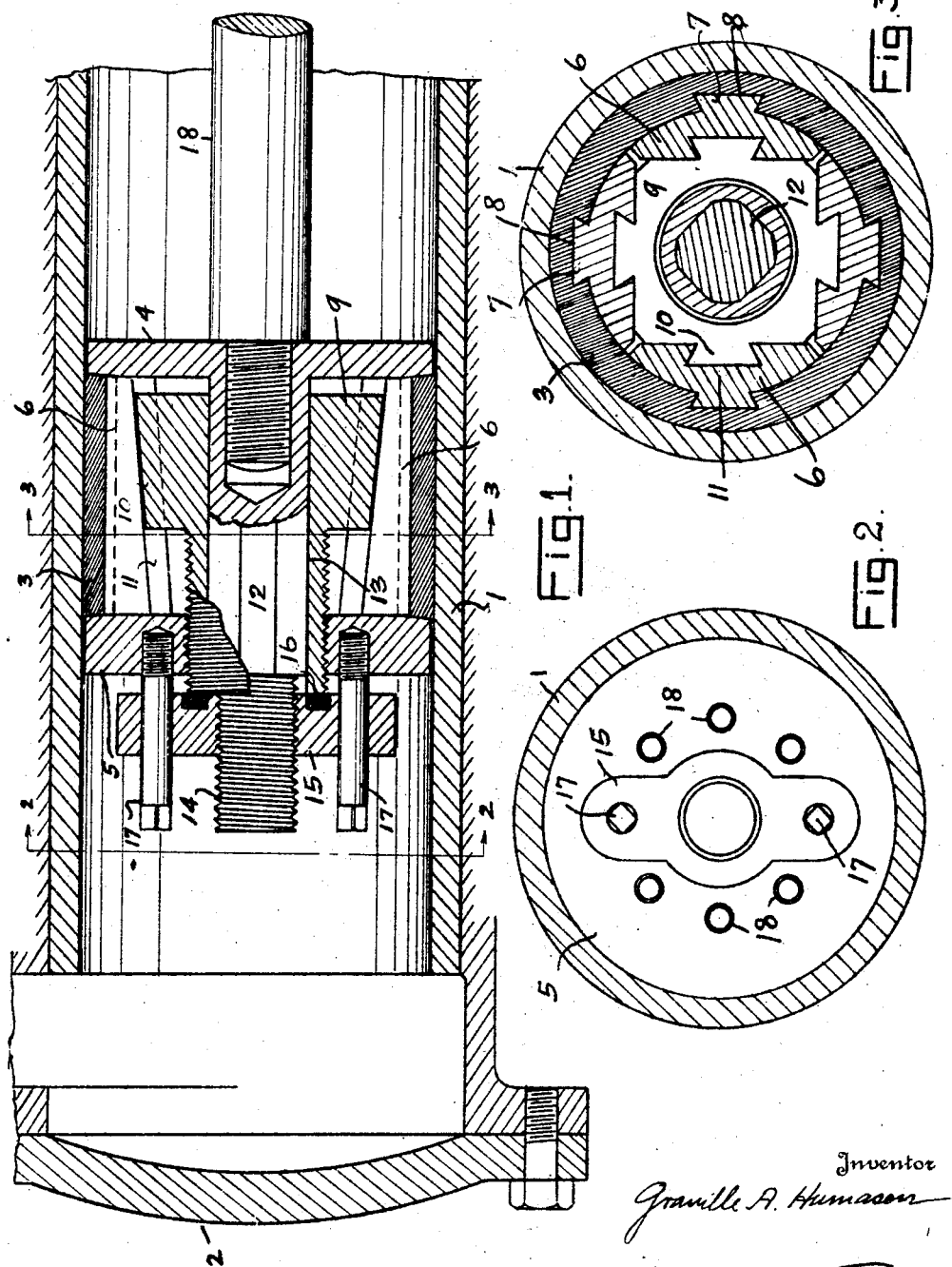

1,629,034

UNITED STATES PATENT OFFICE.

GRANVILLE A. HUMASON, OF HOUSTON, TEXAS.

PUMP PLUNGER.

Application filed June 21, 1926. Serial No. 117,464.

This invention relates to new and useful improvements in a pump plunger.

One object of the invention is to provide a plunger for pumps which may be readily adjusted to secure its proper fit in the pump cylinder.

Another object of the invention is to provide a plunger for pumps which is of such construction that it may be readily expanded or contracted to the required size to secure the desired fit in the pump cylinder, without removing the plunger from the cylinder.

With the above and other objects in view this invention has particular relation to certain novel features of construction, operation and arrangement of parts, an example of which is given in this specification and illustrated in the accompanying drawings, wherein:—

Figure 1 shows a fragmentary longitudinal sectional view of a pump, showing the plunger therein partly in section.

Figure 2 shows a cross sectional view taken on the line 2—2 of Figure 1, and

Figure 3 shows a cross sectional view taken on the line 3—3 of Figure 1.

Referring now more particularly to the drawings, wherein like numerals of reference designate similar parts in each of the figures the numeral 1 designates the pump cylinder having the removable head 2.

The numeral 3 designates the plunger sleeve which may be composed of rubber, composition, or other suitable expansible material. This sleeve is interposed between the end plates 4 and 5 disc-like in form. This sleeve is mounted on, and surrounds, a supporting skeleton composed of the sections 6, which are substantially arcuate in cross sectional contour and which are interposed between and whose ends abut the respective end plates 4 and 5. Each section 6 may have an external, lengthwise, dove tailed rib as 7, fitted into a corresponding groove, as 8, in the sleeve 3. The inner sides of the sections 6 converge and within the supporting skeleton formed by said sections, there is an expander 9, having outer faces which operate against the inner faces of said sections 6 and which taper to conform to the taper of said inner faces, and these abutting faces are provided, one with a dovetailed tenon 10, and the other with a corresponding mortise 11 to receive said tenon.

The end of the expander, adjacent the plate 5, is reduced and threaded through said plate with right hand threads. The other end plate 4 has a polygonal extension 12 fitted through a correspondingly shaped axial bearing 13 through said expander and this extension has its free end 14 reduced and provided with exterior left hand threads to receive the yoke 15 which is threaded thereon.

This yoke carries a packing ring 16 which is counter sunk therein and which is interposed between it and the adjacent end of the expander 9.

Set bolts 17, 17, are fitted through the respective ends of the yoke and screwed into the end plate 5.

The plunger, as described, is attached, in any conventional manner to the plunger rod 18.

When the sleeve 3 becomes worn and it is desired to expand the plunger to secure a closer fit the cylinder head 2 may be removed and the bolts 17 and yoke 15 taken off and the end plate 5 may then be screwed up, thus operating to actuate the expander against the sections 6, to expand them; or if the plunger should fit the cylinder too closely the plate 5 may be unscrewed until the desired fit is obtained. The yoke 17 is then replaced and screwed up against the outer end of the expander to secure the required adjustment and the bolts 17 then replaced. It is to be noted that the outer end of the plate 5 has a plurality of internally threaded sockets, as 19, to receive the bolts 17 at any desired point of adjustment of the yoke 15.

What I claim is:—

A pump plunger including end members, a support between said members formed of sections having converging inside faces, an expander between said end members, one end of which is threaded through one of said members, an expansible sleeve around said support, an extension carried by the other end member and extending through said expander and whose free end is externally threaded, a locking member threaded onto said free end and abutting the adjacent end of said expander and means for securing said locking member against unscrewing.

In testimony whereof I have signed my name to this specification.

GRANVILLE A. HUMASON.